United States Patent
Sills et al.

(10) Patent No.: US 7,196,604 B2
(45) Date of Patent: Mar. 27, 2007

(54) SENSING APPARATUS AND METHOD

(75) Inventors: Colin S. Sills, Harston (GB); David A. James, Harston (GB)

(73) Assignee: TT Electronics Technology Limited (GB)

( * ) Notice: Subject to any disclaimer, the term of this patent is extended or adjusted under 35 U.S.C. 154(b) by 3 days.

(21) Appl. No.: 10/724,336

(22) Filed: Nov. 29, 2003

(65) Prior Publication Data

US 2005/0035836 A1 Feb. 17, 2005

Related U.S. Application Data

(63) Continuation-in-part of application No. PCT/GB03/03718, filed on Aug. 27, 2003, and a continuation-in-part of application No. PCT/GB02/01707, filed on Apr. 12, 2002.

(30) Foreign Application Priority Data

| May 30, 2001 | (GB) | ................................. 0113057.4 |
| Jun. 13, 2001 | (GB) | ................................. 0114441.9 |
| Jun. 20, 2001 | (GB) | ................................. 0115183.6 |
| Jun. 28, 2001 | (GB) | ................................. 0115852.6 |
| Oct. 5, 2001 | (GB) | ................................. 0124007.6 |
| Oct. 30, 2001 | (GB) | ................................. 0126014.0 |
| Mar. 14, 2002 | (GB) | ...................... PCT/GB02/01204 |
| Aug. 27, 2002 | (GB) | ................................. 0219876.0 |
| Jul. 4, 2003 | (GB) | ................................. 0315738.5 |

(51) Int. Cl.
*H01H 9/00* (2006.01)

(52) U.S. Cl. ....................... 335/306; 336/200

(58) Field of Classification Search ................. 336/129, 336/132–4, 84 C, 136, 183, 200, 225; 335/205–7; 324/207.22, 207.17
See application file for complete search history.

(56) References Cited

U.S. PATENT DOCUMENTS 3,772,587 A 11/1973 Farrand et al.

(Continued)

FOREIGN PATENT DOCUMENTS

DE 42 30 950 9/1993

(Continued)

OTHER PUBLICATIONS

"Sensing Position" by Mark Howard and Richard Doyle, published on the internet in Appliance Manufacturer Magazine, Mar. 27, 2001.

(Continued)

*Primary Examiner*—Elvin Enad
*Assistant Examiner*—Bernard Rojas
(74) *Attorney, Agent, or Firm*—Fogg & Associates, LLC; David N. Fogg

(57) ABSTRACT

There is described a position sensor comprising at least one planar substrate having formed thereon a magnetic field generator which comprises conductive tracks formed on at least two planes defined by the at least one planar substrate. An intermediate coupling element is operable to move relative to the at least one planar substrate along a measurement direction transverse to the planar substrate, the detector detects the position of the intermediate coupling element in a magnetic field generated by the magnetic field generator. The position sensor has particular application in man-machine interfaces such as push buttons and rotary switches.

26 Claims, 14 Drawing Sheets

U.S. PATENT DOCUMENTS

| | | | |
|---|---|---|---|
| 3,789,393 A | | 1/1974 | Tripp |
| 3,819,025 A | * | 6/1974 | Fushida et al. ............. 400/155 |
| 4,253,079 A | * | 2/1981 | Brosh ...................... 336/84 C |
| 4,282,485 A | | 8/1981 | Pauwels et al. |
| 4,467,320 A | | 8/1984 | McPhee |
| 4,671,116 A | | 6/1987 | Glennon et al. |
| 4,697,144 A | | 9/1987 | Howbrook |
| 4,737,698 A | | 4/1988 | McMullin et al. |
| 4,853,666 A | | 8/1989 | Fesenmeier et al. |
| 4,893,077 A | | 1/1990 | Auchterlonie |
| 4,893,078 A | | 1/1990 | Auchterlonie |
| 4,959,631 A | * | 9/1990 | Hasegawa et al. ............. 336/83 |
| 4,970,450 A | | 11/1990 | Karl et al. |
| 5,023,408 A | | 6/1991 | Murakami et al. |
| 5,173,696 A | | 12/1992 | Howard et al. |
| 5,260,650 A | | 11/1993 | Schwesig et al. |
| 5,433,115 A | | 7/1995 | Spillman, Jr. et al. |
| 5,513,913 A | | 5/1996 | Ball et al. |
| 5,598,153 A | | 1/1997 | Brasseur et al. |
| 5,646,496 A | | 7/1997 | Woodland et al. |
| 5,793,202 A | | 8/1998 | Ikemoto |
| 5,793,204 A | | 8/1998 | Logue |
| 5,796,250 A | | 8/1998 | Dames |
| 5,815,091 A | * | 9/1998 | Dames et al. .......... 340/870.34 |
| 6,124,708 A | | 9/2000 | Dames |
| 6,239,571 B1 | | 5/2001 | Shimahara |
| 6,304,014 B1 | | 10/2001 | England et al. |
| 6,489,899 B1 | * | 12/2002 | Ely et al. ...................... 341/20 |

FOREIGN PATENT DOCUMENTS

| | | |
|---|---|---|
| EP | 0 487 730 | 6/1992 |
| EP | 0 748 054 | 12/1996 |
| EP | 0 772 025 | 5/1997 |
| EP | 1 308 697 A2 | 5/2003 |
| GB | 2 021 273 | 11/1979 |
| GB | 2 044 461 | 10/1980 |
| GB | 2 197 078 | 5/1988 |
| JP | 57-122311 | 7/1982 |
| JP | 59 205821 | 11/1984 |
| JP | 63-218819 | 9/1988 |
| SU | 1458946 | 2/1986 |
| WO | WO 98/00921 | 1/1998 |
| WO | WO 98/43046 | 10/1998 |
| WO | WO 99/34171 | 7/1999 |
| WO | WO 99/61868 | 12/1999 |
| WO | WO 03/038380 A1 | 5/2000 |
| WO | WO 00/33244 | 6/2000 |
| WO | WO 00/77480 | 12/2000 |
| WO | WO 01/29759 | 4/2001 |
| WO | WO 01/42865 | 6/2001 |
| WO | WO 02/097374 A1 | 12/2002 |

OTHER PUBLICATIONS

"Innovative Interfaces" by Mark Howard, published on the internet in Appliance Manufacturer Magazine, Oct. 26, 2001.

"Accurate Linear Measurement Using LVDT's" by George Novacek, Circuit Cellular, Issue 106, May 1999, pp. 1-6.

* cited by examiner

SENSING APPARATUS AND METHOD

CROSS-REFERENCE TO RELATED APPLICATIONS

This application is a continuation-in-part application of International Application No. PCT/GB02/01707 filed 12 Apr. 2002 designating the United States and entitled "Sensing Apparatus and Method", and also a continuation-in-part application of International Application No. PCT/GB2003/003718 filed 27 Aug. 2003 designating the United States and entitled "Sensing Apparatus and Method". The whole contents of International Patent Application Nos PCT/GB02/01707 and PCT/GB2003/003718 are hereby incorporated in this application by reference.

FIELD OF THE INVENTION

This invention relates to a method of sensing the position or the speed of an object, and an apparatus therefor. The invention has particular, but not exclusive, relevance to a man-machine interface which is mounted on a fascia panel or the like.

BACKGROUND OF THE INVENTION

There are numerous examples of devices which have a man-machine interface mounted on a fascia panel. For example, domestic appliances such as ovens and washing machines usually have a fascia panel which has controls which allow the user to set control parameters.

Capacitive sensors have been used in fascia panels for industrial ovens. Capacitive sensors are non-contact sensors, and are therefore less prone to mechanical wear than contact sensors. However, a disadvantage of capacitive sensors is that exposure to liquids such as water can lead to incorrect readings. It will be appreciated that ovens are often operated in a humid environment, and therefore water may condense on the fascia panel of the oven. It is therefore possible for a drop of water to form adjacent to a capacitive sensor causing an incorrect control parameter to be entered.

Inductive sensors are a known alternative to capacitive sensors. Typically, in an inductive position sensor the electromagnetic coupling between a transmit aerial and a receive aerial is varied in response to relative movement between a first member and a second member, thereby allowing the relative position of the first and second members to be determined from the signal induced in the receive aerial when an excitation signal is applied to the transmit aerial. For example, international patent application WO 03/038379 describes a position sensor in which a transmit aerial, formed by two excitation windings, and a receive aerial, formed by a sensor winding, are formed on a printed circuit board, and a resonant circuit is formed on a sensor element which is movable relative to the printed circuit board. The two excitation windings are shaped so that the electromagnetic coupling between the excitation windings and the resonant circuit varies along a measurement path, which is parallel with the plane of the printed circuit board, in accordance with a sine function and a cosine function respectively. By respectively applying an in-phase oscillating signal and a quadrature oscillating signal (that is 90° out of phase with the in-phase oscillating signal) to the two excitation windings, an oscillating signal is generated in the resonant circuit whose phase is dependent upon the position of the sensor element along the measurement path. The oscillating signal in the resonant circuit in turn induces an oscillating signal in the sensor winding whose phase is indicative of the position of the sensor element along the measurement path.

For the position sensor described in WO 03/038379, using conventional techniques it is difficult to deposit the two excitation windings so that the period of the associated sine and cosine functions is less than a few centimeters, and this limits the available resolution for position measurement. Further, the position sensor described in WO 03/038379 measures movement of a sensor element along a measurement path parallel to the plane of a planar member, and therefore is not well suited to applications in which movement of a sensor element transverse (i.e. crossing) to the plane of a planar member, for example a fascia panel, is to be measured.

SUMMARY OF THE INVENTION

According to an aspect of the invention, there is provided an inductive position sensor comprising a magnetic field generator comprising conductive tracks formed on at least two planes. A sensor element is operable to move relative to the magnetic field generator along a measurement direction which crosses the planes on which the magnetic field generator is formed. A detector is operable to detect the position of the sensor element in a magnetic field generated by the magnetic field generator.

In an embodiment, the magnetic field generator comprises conductive tracks on different layers of a multi-layer printed circuit board.

In an embodiment, the conductive tracks of the magnetic field generator are associated with a transmit aerial, the detector comprises a receive aerial, and the sensor element forms an intermediate coupling element between the transmit aerial and the receive aerial. The electromagnetic coupling between the transmit aerial and the receive aerial varies with the position of the sensor element, enabling the detector to detect the position of the sensor element from a signal induced in the receive aerial.

Preferably, the inductive sensor forms part of a man-machine interface having a fascia panel. The man-machine interface may be, for example, a push button or a rotary switch.

BRIEF DESCRIPTION OF THE DRAWINGS

Various embodiments of the invention will now be described with reference to the attached Figures in which.

DETAILED DESCRIPTION

First Embodiment

Figure 1:
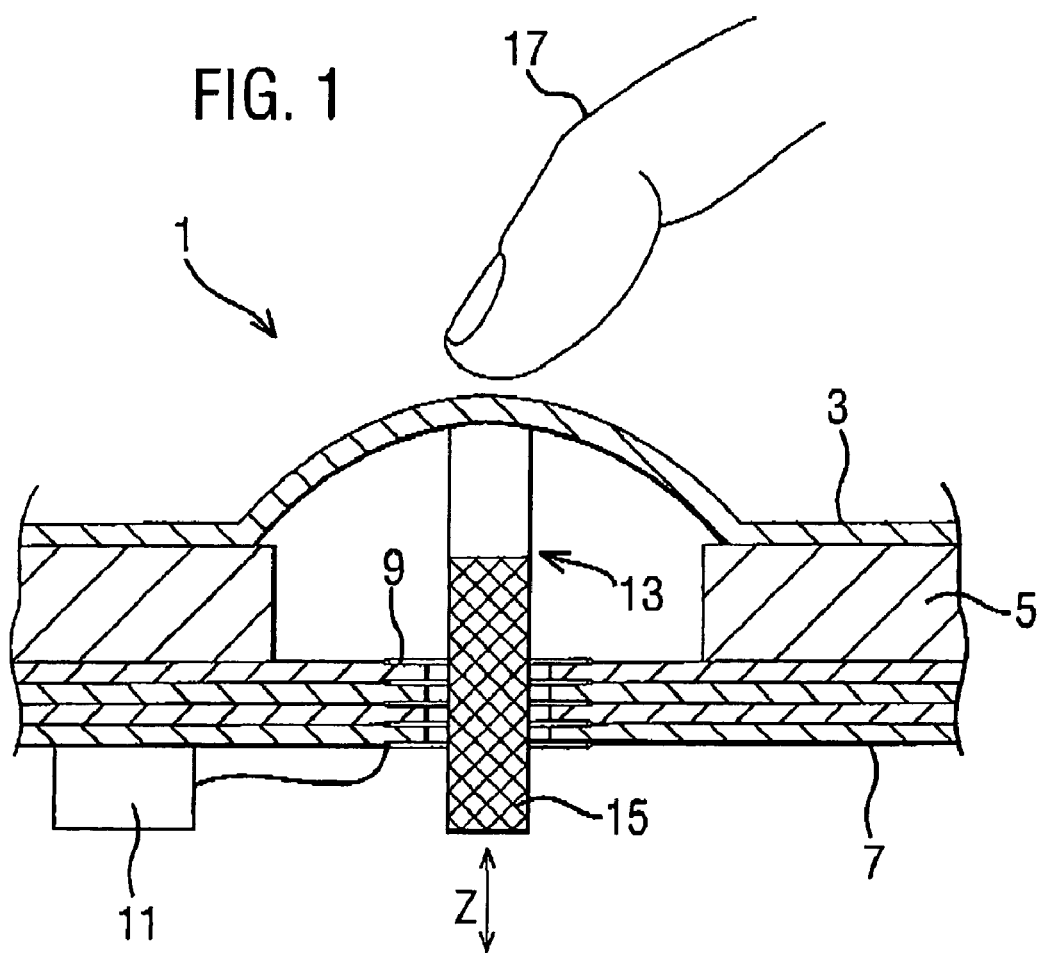
FIG. 1 schematically shows a side view of a push button assembly which forms a first embodiment of the invention.

FIG. 1 shows a push button assembly 1 in which a resiliently flexible membrane 3 is mounted to one side of a planar substrate 5, which in this embodiment is an ABS fascia panel. A hole is formed through the planar substrate 5 and the membrane 3 is arranged to arc above the hole. A multi-layer printed circuit board (PCB) 7 is mounted to the face of the substrate 5 away from the flexible membrane 3, and the PCB 7 has an aperture therethrough which is aligned with the centre of the hole through the planar substrate 5.

Conductive tracks 9 deposited on the layers of the multi-layer PCB 7 form a transmit aerial and a receive aerial as will be described in more detail hereafter. The conductive tracks 9 are connected to signal generation and processing circuitry 11 which is mounted to the face of the multi-layer PCB 7 away from the planar substrate S. The signal generation and processing circuitry 11 applies excitation signals to the transmit aerial, which cause the transmit aerial to generate a magnetic field, and processes a sense signal induced in the receive aerial as a result of the generated magnetic field.

An elongate rod 13 is connected to the arced portion of the membrane 3 such that it projects through the hole in the substrate 5 and the hole in the multi-layer PCB 7. The longitudinal axis of the rod 13 is therefore substantially perpendicular to the plane of the substrate 5. The rod 13 includes a ferrite element 15 which is generally aligned with the hole through the PCB 7. The ferrite element 15 modifies the distribution of the magnetic field strength (i.e. the H-field) produced when excitation signals are applied to the transmit aerial in such a manner that the signal induced in the receive aerial varies in dependence upon the position of the ferrite element 15 relative to the transmit aerial and the receive aerial. Therefore, movement of the ferrite element is along the longitudinal axis z of the elongate rod 13, hereafter called the measurement direction, in response to a finger 17 of a user pressing the arced portion of the flexible membrane 3 can be detected.

In this embodiment, the membrane 3 forms a hermetic seal isolating the signal generating and processing circuitry 11 from the outside of the bush button assembly 1. This is advantageous in situations where liquid or dirt may come into contact with the push button assembly 1.

Figure 2:
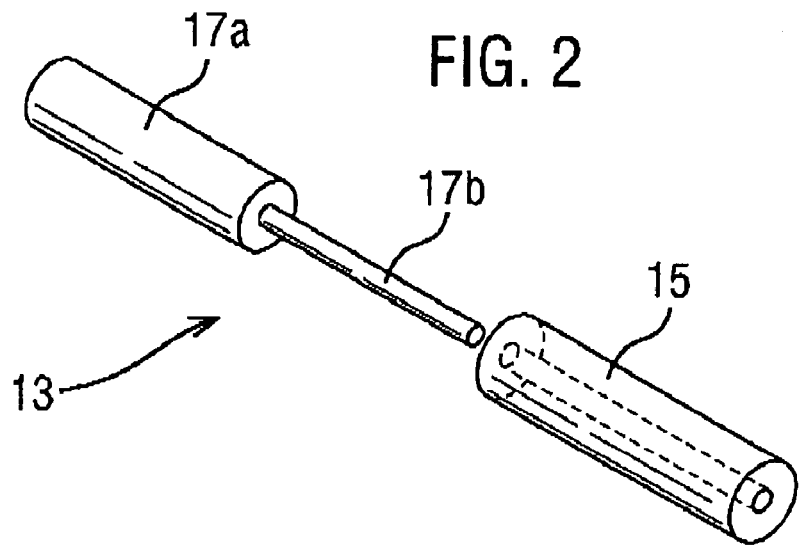
FIG. 2 shows an exploded view of a rod forming part of the push button assembly illustrated in FIG. 1.

FIG. 2 shows an exploded view of the rod 13. As shown, the ferrite element 15 is a elongate cylinder having an annular cross-section. In this embodiment, the length of the ferrite element 15 is 4 mm and the outer and inner diameters of the annular cross-section are 3 mm and 1 mm respectively. The rod 13 also includes a cylindrical mount having at one end a wide portion 17a, which in this embodiment has a diameter of 3 mm, and at the other end a narrow portion 17b, which in this embodiment has a diameter of 1 mm. When assembled, the narrow portion 17b passes through the hole through the middle of the ferrite element 15 in order to improve the fixing, by glue, of the ferrite element 15 to the mount of the rod 13. The end of the wide portion 17a away from the ferrite element 15 is attached to the arced portion of the membrane 3.

The transmit aerial and the receive aerial provided on the multi-layer PCB 7 will now be described in more detail with reference to FIGS. 3 and 4.

Figure 3:
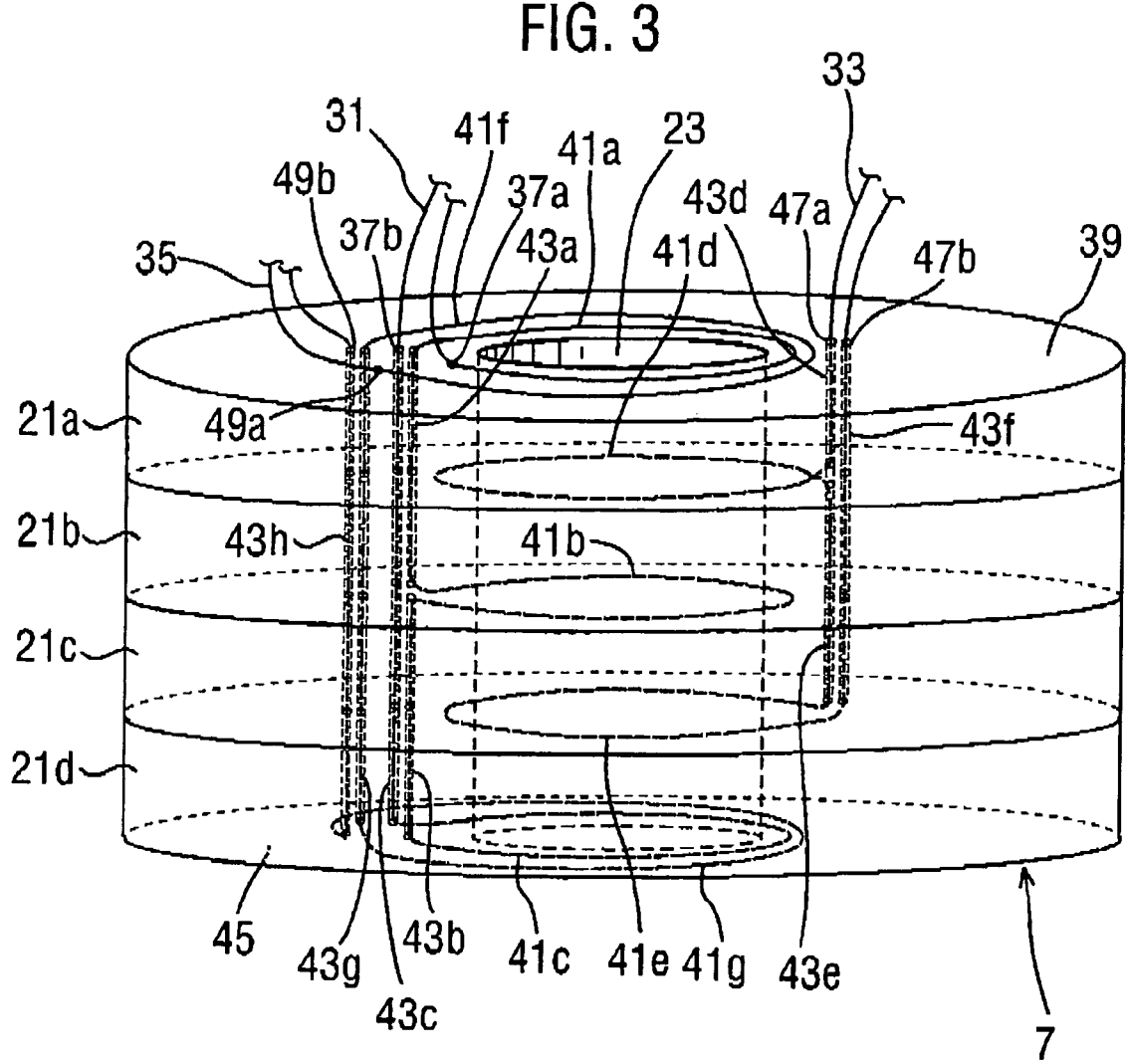
FIG. 3 schematically shows a perspective view of a multi-layer printed circuit board forming part of the push button assembly illustrated in FIG. 1, showing a sine winding, a cosine winding and a sense winding which are formed on the multi-layer printed circuit board.

FIG. 3 shows a perspective view of the part of the multi-layer PCB 7 on which the conductive tracks forming the transmit aerial and the receive aerial are deposited. In this embodiment, the deposited tracks are 1 oz copper tracks which have a thickness of approximately 35 µm. As shown in FIG. 3, the multi-layer PCB 7 has four laminated substrate layers 21a to 21d and five conductive track layers (the two end surfaces and the three surfaces between the four substrate layers). In conventional parlance, the multi-layer PCB 7 is referred to as a five-layer printed circuit board, where the "five" refers to the number of conductive track layers. In this embodiment, the multi-layer PCB 7 is FR4 grade circuit board with each substrate layer having a thickness of 0.5 mm. The aperture 23 is formed through the centre of the multi-layer PCB 7, and in this embodiment the diameter of the aperture 23 through the multi-layer PCB 7 is 4 mm.

The transmit aerial is formed by a cosine winding 31 and a sine winding 33 which are each distributed over plural layers of the multi-layer PCB 7. The receive aerial is formed by a sense winding 35 which is also distributed over plural layers of the multi-layer PCB 7. For ease of illustration, the ends of the cosine winding 31, sine winding 33 and sense winding 35 have been shown lifted away from the multi-layer PCB 7 in FIG. 3. In practice the cosine winding 31, the sine winding 33 and the sense winding 35 are connected to the signal generation and processing circuitry 11 by conductive tracks formed on the multi-layer PCB 7.

The cosine winding 31 is formed by a conductive track which starts at a first terminal 37a on the surface 39 of the first substrate layer 21a and forms a first current loop 41a on the first substrate layer 21a around the aperture 23. The conductive track then passes through a first via hole 43a to the surface between the second substrate layer 21b and the third substrate layer 21c, and forms a second current loop 41b around the aperture 23 on the surface between the second substrate layer 21b and the third substrate layer 21c. The direction of the second current loop 41b around the aperture is opposite to the direction of the first current loop 41a around the aperture 23. The conductive track then passes through a second via hole 43b to the end surface 45 of the multi-layer PCB 7 opposing the end surface 39, and forms a third current loop 41c around the aperture 23. The direction of the third current loop 41c around the aperture 23 is the same as the direction of the first current loop 41a around the aperture 23. The conductive track then passes to a second terminal 37b on the surface 39 of the first layer 21a through a third via hole 43c.

The sine winding 33 is formed by a conductive track which starts from a first terminal 47a on the surface 39 of the first substrate layer 21a and passes to the surface between the first substrate layer 21a and the second substrate layer 21b through a fourth via hole 43d, and forms a fourth current loop 41d around the aperture 23. The conductive track then passes to the surface between the third substrate layer 21c and the fourth substrate layer 21d through a fifth via hole 43e, forms a fifth current loop 41e around the aperture 23, and then passes to a second terminal 47b on the surface 39 of the first substrate layer 21a through a sixth via hole 43f. The fourth current loop 41d loops around the aperture 23 in the opposite direction to the first current loop 41a, and the fifth current loop 41e loops around the aperture in the same direction as the first current loop 41a.

Figure 4:
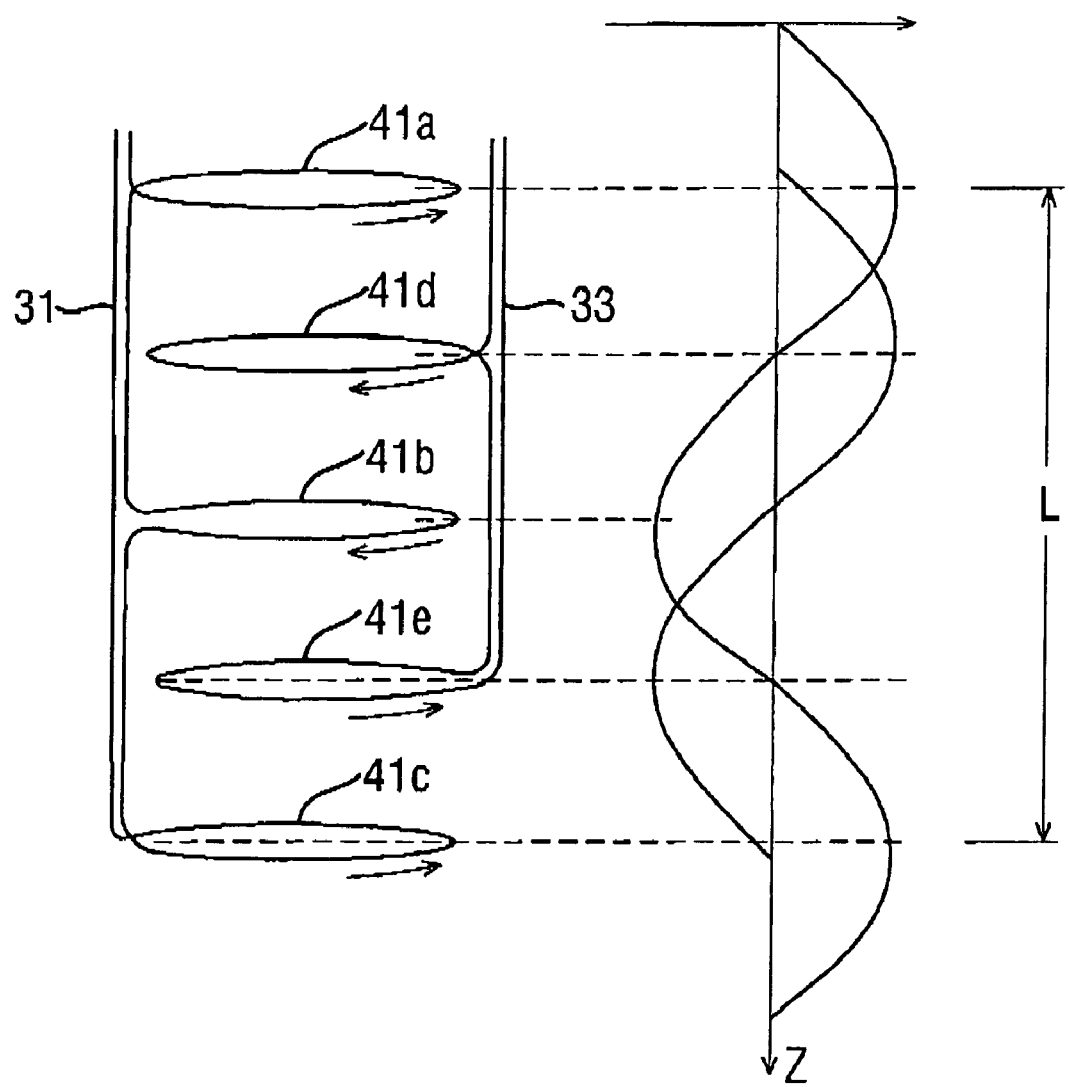
FIG. 4 schematically shows the variation of the respective magnetic field strength components perpendicular to the multi-layer printed circuit board produced by excitation signals flowing through the sine winding and the cosine winding.

As schematically shown in FIG. 4, when a signal is applied to the cosine winding 31, a magnetic field is generated having an axial magnetic field component which varies along the axial direction Z with maximum values at the axial positions of the first, second and third current loops 41a,41b,41c and minimum values at the axial positions of the fourth and fifth current loops 41d, 41e. The maximum values at the axial positions of the first and third current loops 41a,41c have the same polarity, and have an opposite polarity to the maximum value at the second current loop 41b. When a signal is applied to the sine winding 33, a magnetic field is generated having maximum values of opposite polarities at the axial positions of the fourth and fifth current loops 41d,41e, and minimum values at the axial positions of the first, second and third current loops 41a, 41b,41c. In particular, as shown in FIG. 4, the magnetic field components along the axial direction 2 generated by the cosine winding 31 and the sine winding 33 vary in a substantially sinusoidal manner with a period of just over 2 mm, but a quarter of a cycle out of phase. The period is just over 2 mm, rather than 2 mm exactly, because the sine winding 33 and the cosine winding 31 do not include an infinite series of loops.

Returning to FIG. 3, in this embodiment the sense winding 35 is formed by a conductive track which starts at a terminal 49a on the end surface 39 of the first substrate layer 21a, forms a sixth current loop 41f around the aperture 23, and then passes through a seventh via hole 43g to the end surface 45 of the fourth substrate layer 21d. The conductive track then forms a seventh current loop 41g around the aperture 23, which passes around the aperture in the same direction as the sixth current loop 41f. The conductive track then passes to a terminal 49b on the end surface 39 of the first layer 21a through an eighth via hole 43h.

With this arrangement, in the absence of the ferrite element 15 the sense winding 35 is balanced with respect to both the cosine winding 31 and the sine winding 33. In other words, in the absence of the ferrite element 15 the net electromotive force induced in the sense winding 35 by current flowing through the cosine winding 31 is substantially zero, and similarly the net electromotive force induced in the sense winding 35 by current flowing through the sine winding 33 is substantially zero. Further, the sixth current loop 41f and the seventh current loop 41g effectively form a pair of Helmholtz coils. Such an arrangement has the advantage that the signal level of the signal induced in the sense winding 35 does not vary significantly with the position of the ferrite element 15, because as the signal induced in one current loop increases the signal induced in the other current loop decreases by the approximately the same amount.

Figure 5:
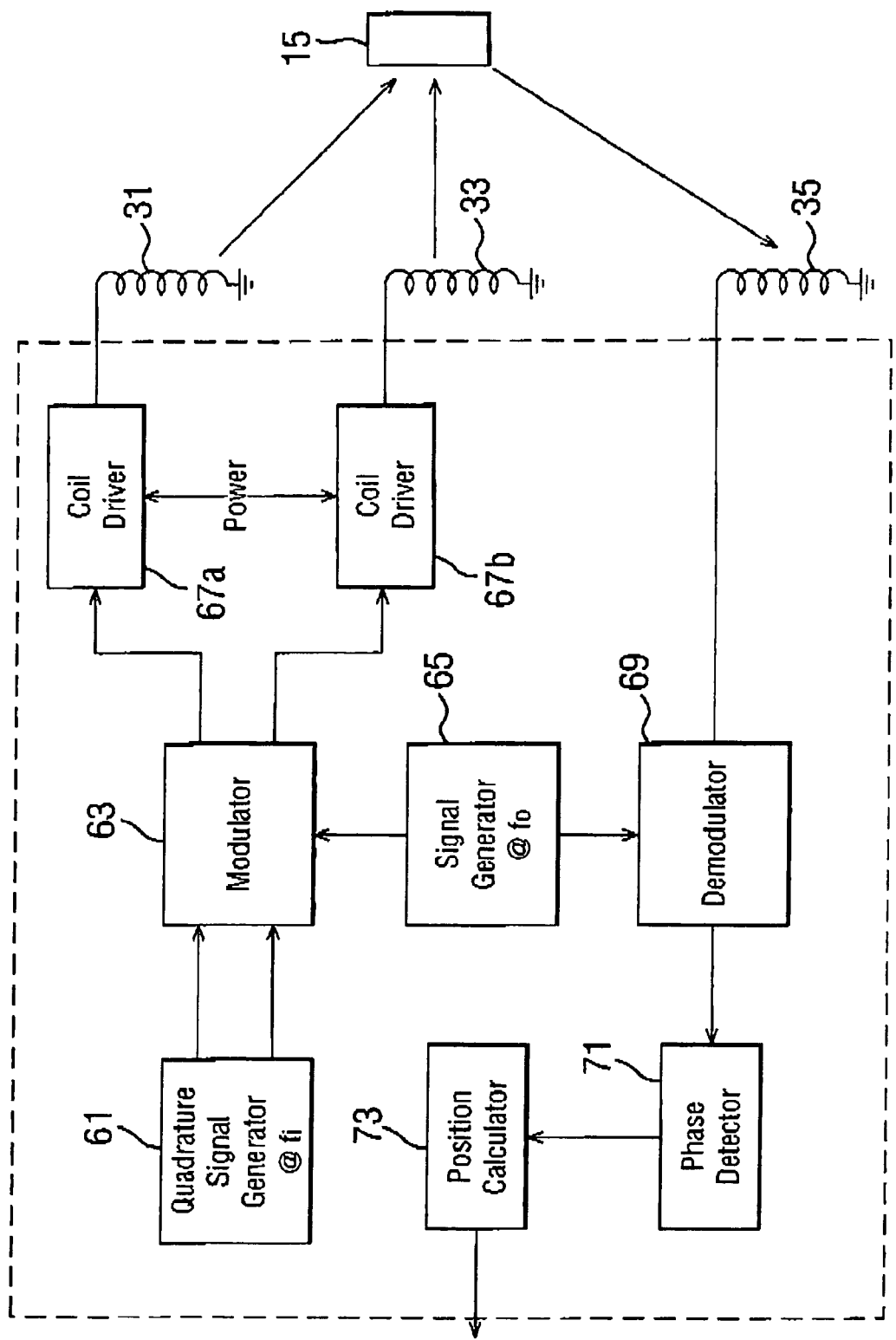
FIG. 5 schematically shows the main components of signal generation and processing circuitry forming part of the push button assembly illustrated in FIG. 1.

The main components of the signal generation and processing apparatus 11 will now be described with reference to FIG. 5.

As shown, a quadrature signal generator 61 outputs a quadrature pair of signals at a modulation frequency $f_1$ to a modulator 63, which uses the quadrature pair of signals to modulate a carrier signal, at a carrier frequency $f_0$, generated by a signal generator 65. In this embodiment, the modulation frequency $f_1$ is 3.9 kHz and the carrier frequency $f_0$ is 2 MHz. The pair of modulated signals are respectively input to a pair of coil drivers 67a, 67b, which amplify the modulated signals to produce an in-phase signal I(t) and a quadrature signal Q(t).

The in-phase signal I(t) and the quadrature signal Q(t) are respectively applied to the sine winding 33 and the cosine winding 31. As discussed previously, in the absence of the ferrite element 15, signals flowing through the cosine winding 31 and the sine winding 33 induce a negligible signal in the sense winding 35. However, the ferrite element 15 causes localised bunching of the magnetic field resulting in a signal being induced in the sense winding 35 which varies with the average position Z of the ferrite element 15 along the measurement direction z. In particular, an electromotive force (EMF) is induced in the sense winding 35 which results in an induced sense signal S(t) of the form:

$$S(t) \propto \cos 2\pi f_0 \cos(2\pi f_1 t - 2\pi Z/L) \qquad (1)$$

where L is the period of the sinusoidal variation in the magnetic field strength component along the measurement axis produced by the cosine winding 33 and the sine winding 31. The sense signal S(t) therefore corresponds to a signal at the modulation frequency $f_1$ having a phase which varies linearly with the position of the ferrite element 15 modulated by a signal at the carrier frequency $f_0$.

The sense signal S(t) is input to a demodulator 69 which demodulates the received sense signal S(t), using a signal at the carrier frequency $f_0$ from the signal generator 65, to form a demodulated signal at the modulation frequency $f_1$. The demodulated signal output by the demodulator 69 is input to a phase detector 71, which measures the phase of the demodulated signal, and outputs the phase measurement to a position calculator 73.

The position calculator 73 determines the position of the ferrite element 15 from the phase measurement output by the phase detector 71. In particular, in this embodiment the position is substantially proportional to the measured phase, and therefore the phase calculator simply multiplies the measured phase by a calibration factor.

Second Embodiment

In the first embodiment, by depositing conductive tracks between the layers of, and on the end surfaces of, a multi-layer PCB 7 which is parallel with a planar substrate 5, the sinusoidal variation along a measurement direction z of the magnetic field strength components perpendicular to the planar substrate 5 associated with the cosine winding 31 and the sine winding 33 is achieved.

A second embodiment will now be described with reference to FIGS. 6 to 9 in which the five-layer PCB 7 of the first embodiment is replaced by a two-layer PCB 91, with the sinusoidal variation in magnetic field strength component perpendicular to the planar substrate 5 being achieved by a sine winding and a cosine winding formed by conductive tracks which are deposited on a first surface 93 and a second surface 95 which are on either side of the single substrate layer 91, and by through-plated via holes passing through the single substrate layer 91. The two-layer PCB 91 has an aperture 97 through which the ferrite element 15 passes. The remaining components of the push button assembly of the second embodiment are identical with the corresponding components of the push button assembly of the first embodiment, and will not therefore be described in detail again.

Figure 6:
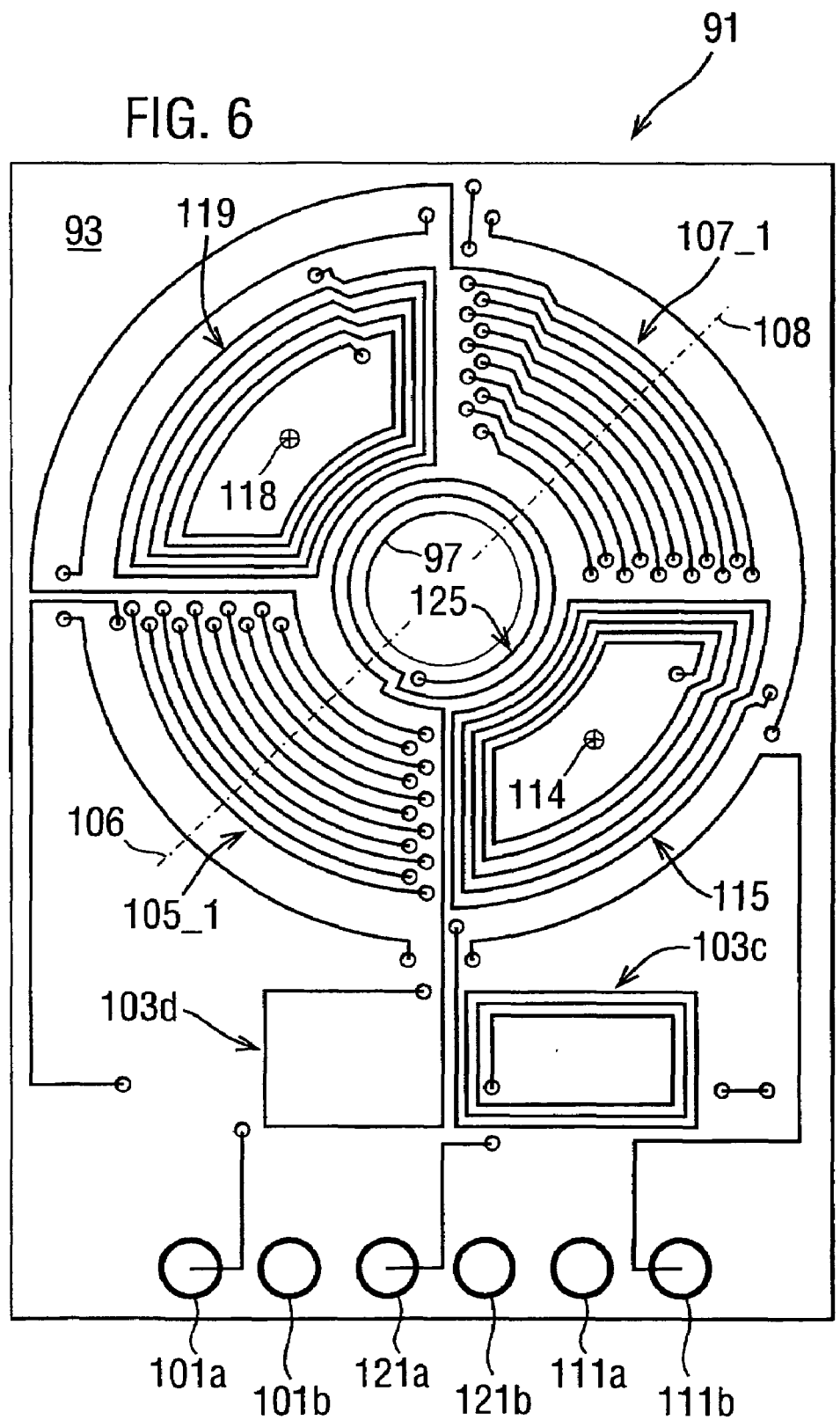
FIG. 6 shows the layout of conductive tracks deposited on one side of a printed circuit board which forms part of a second embodiment of the invention, the conductive tracks forming part of a sine winding, a cosine winding and a sense winding.
Figure 7:
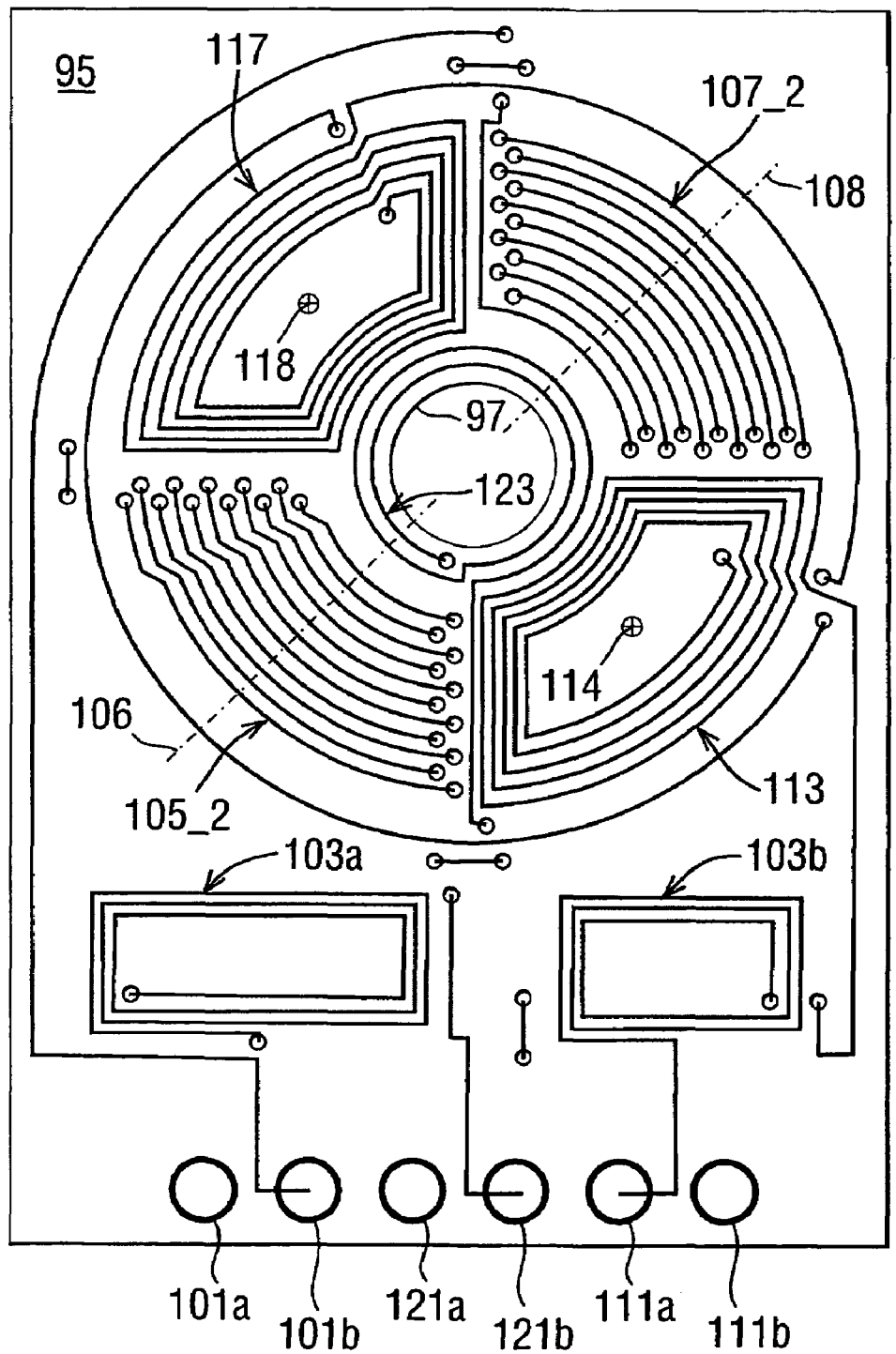
FIG. 7 shows the layout of conductive tracks, forming part of the sine winding, the cosine winding and the sense winding, deposited on the other side of the printed circuit board illustrated in FIG. 6.

FIGS. 6 and 7 respectively show plan views of the conductive tracks deposited on the first surface 93 and the second surface 95 of the two-layer PCB 91, with both plan views being shown as viewed from the positive z direction for ease of comprehension. In this embodiment, the two-layer PCB 91 is a 2 mm thick layer of FR4 grade circuit board. As in the first embodiment, the conductive tracks are 1 oz copper tracks.

The sine winding is formed by a conductive track which starts at a first sine terminal 101a on the first surface 93 and passes through a via hole to a first balancing winding 103a on the second surface 95. The conductive track then passes to a first sine coil 105, which is formed by a first series of radially-stepped concentric arced tracks 105_1 deposited in a first quadrant of the first surface 93 with the ends of each track connected through via holes to the ends of a second series of radially-stepped concentric arced tracks 105_2 which are deposited on the second surface 95 of the single-layer PCB. As shown in FIG. 7, each of the second series of tracks 105_2 includes a kink so that the ends of each of the second series of conductive tracks are connected to respective different tracks of the first series of tracks 105_1. In this way, the first sine coil 105 is a spiral conductive track about a first radial axis 106 (with respect to the centre of the aperture 97) through the two-layer PCB 91.

After the first sine coil 105, the sine winding passes through a second sine coil 107 which is formed in a second quadrant of the two-layer PCB 91 which is opposite to the first quadrant. In the same manner as the first sine coil 105, the second sine coil 107 is formed by a first series of radially-stepped concentric arced tracks 107_1 deposited on the first surface 93 of the two-layer PCB 91 whose ends are connected through via holes to the ends of a second series of radially-stepped concentric arced tracks 107_2 deposited on the second surface 95 of the two-layer PCB 91, with a kink being provided in each of the first set of tracks 107_1 so that the ends of each of the first series of conductive tracks 107_1 are connected to respective different tracks of the second series of tracks 107_2. In this way, the second sine coil 107 is a spiral conductive track formed about a second radial axis 108 through the two-layer PCB 91 which is co-axial with the first radial axis 106 about which the first sine coil 105 is formed, with the second sine coil 107 looping around the common axis in the opposite direction to the first sine coil 105. After the second sine coil 107, the sine winding passes to a second sine terminal 101b.

Figure 8:
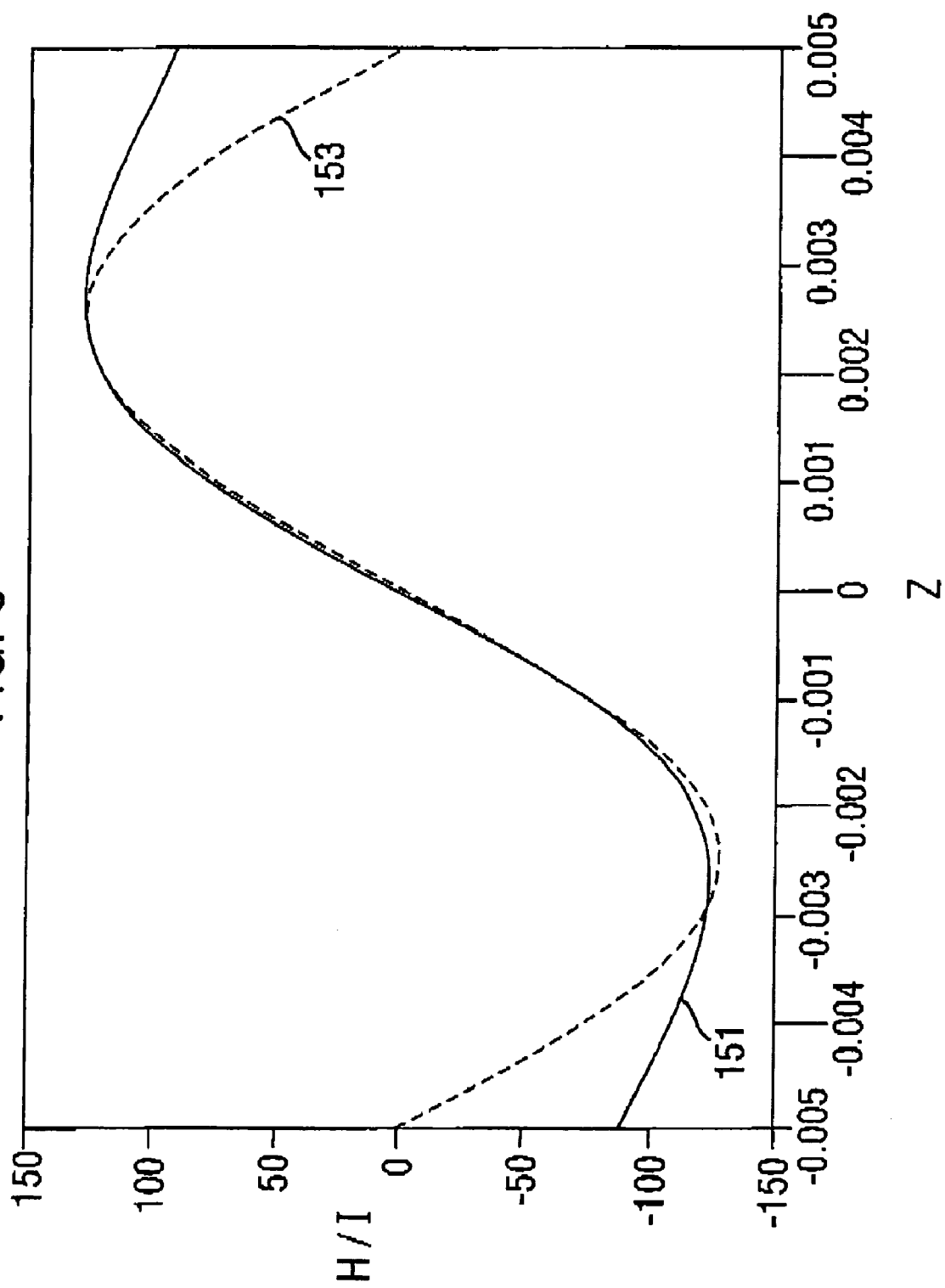
FIG. 8 is a plot comparing the magnetic field strength component perpendicular to the printed circuit board produced by an excitation signal flowing through the sine winding of the second embodiment with a sine function.

FIG. 8 shows a plot of the magnetic field strength component perpendicular to the plane of the single-layer PCB 91 produced per unit current flowing through the sine winding, indicated by the full line 151, compared with a sine function having a period of 10 mm, indicated by the dashed line 153. As shown, the magnetic field component 151 closely matches the sine function 153 over a range of 6 mm around the centre of the single-layer PCB.

Returning to FIGS. 6 and 7, the cosine winding starts at a first cosine terminal 111a and passes, via a second balancing winding 103b, to a first cosine coil 113 formed around a first axial axis 114 perpendicular to the plane of the PCB 91 by a spiral conductive track deposited on a third quadrant, which is between the first and second quadrants, of the second surface 95 of the two-layer PCB 91. The cosine winding then passes through a via hole to a second cosine coil 115 formed around the first axial axis 114 by a spiral conductive track deposited on the third quadrant of the first surface 93 of the two-layer PCB 91. The cosine winding then passes to a third cosine coil 117 formed around a second axial axis 118 perpendicular to the plane of the PCB 91 by a spiral conductive track deposited in a fourth quadrant, which is opposite the third quadrant, of the second surface 95 of the two-layer PCB 91, and then passes through a via hole to a fourth cosine coil 119 formed around the second axial axis 118 by a spiral conductive track deposited in the fourth quadrant of the first surface 93 of the two-layer PCB 91.

Each of the first to fourth cosine coils effectively comprises a series of inner circumferential tracks and a series of outer circumferential tracks connected at their ends by radial tracks. Current flowing through the inner and outer circumferential tracks respectively generate first and second parts of the magnetic field strength component along the axis of movement of the ferrite element 15 (which passes through the aperture in the two-layer PCB 91). Both the first part and the second part of the magnetic field strength component have a maximum value in the centre of the plane of the two-layer PCB 91, and decrease with distance away from the two-layer PCB 91 along the axis of movement of the ferrite element. The maximum value of the first part has a greater amplitude than, and an opposite polarity to, the maximum value of the second part, but the amplitude of the second part decreases more slowly with distance from the single layer PCB 91 than the amplitude of the first part. The radial tracks have substantially no effect on the magnetic field strength component along the axis of movement of the ferrite element 15.

In this way, the magnetic field strength component along the axis of movement of the ferrite element has a maximum value, with the polarity of the first part produced by the inner circumferential tracks, in the plane of the two-layer PCB 91, and on both sides of the two-layer PCB 91 drops through zero to a maximum value with the polarity of the second part produced by the outer circumferential fields. In this embodiment, the additional outer circumferential tracks connecting the second cosine coil 115 to the third cosine coil 117 and connecting the fourth cosine coil 119 to a second cosine terminal 111b are configured so that the magnetic field strength component along the direction of movement of the ferrite element approximates closely to a cosine function. In particular, these additional outer circumferential tracks cover approximately two loops around the outside of the sine coils and cosine coils.

Figure 9:
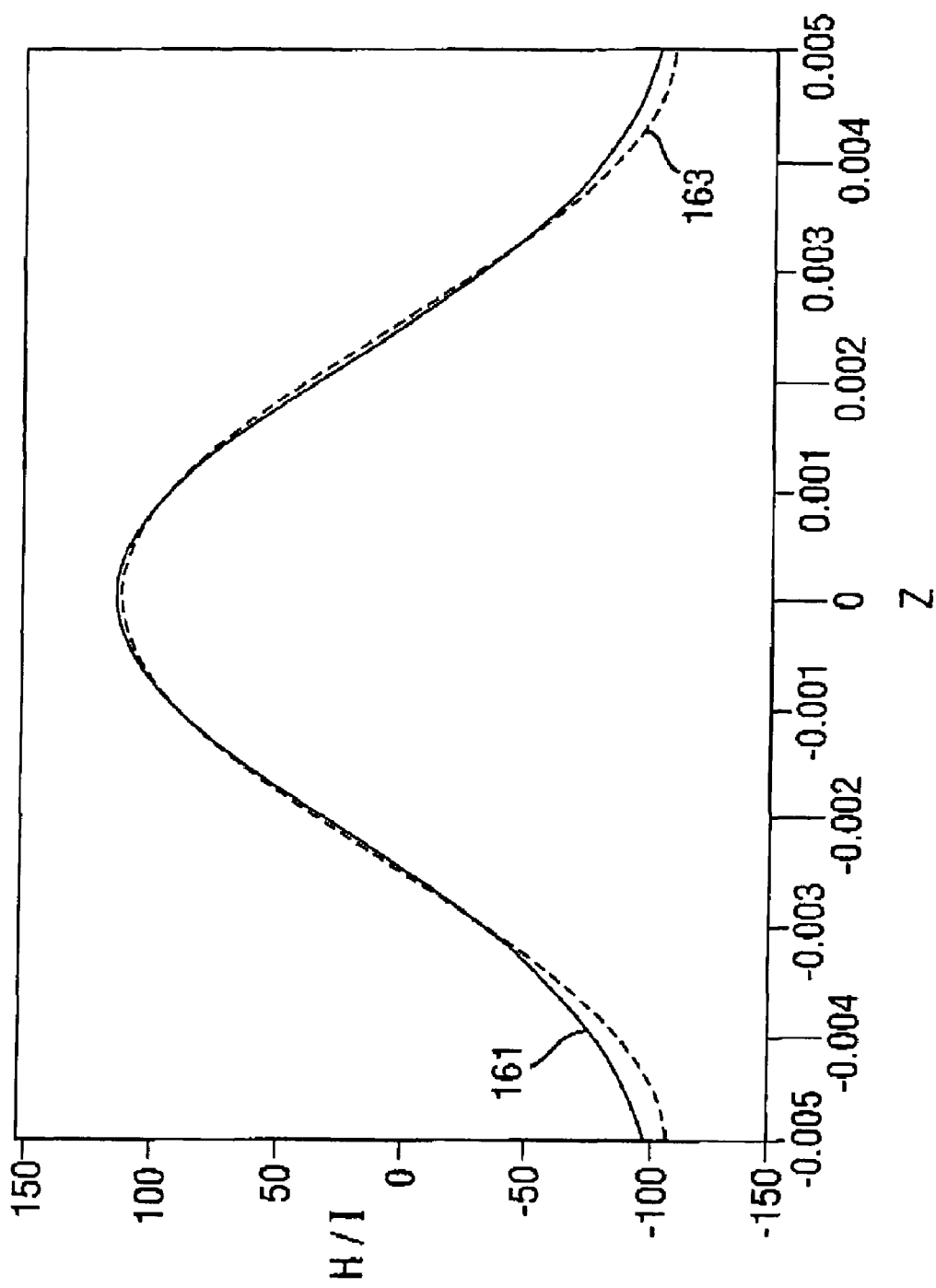
FIG. 9 is a plot comparing the magnetic field strength component perpendicular to the printed circuit board produced by an excitation signal flowing through the cosine winding of the second embodiment with a cosine function.

FIG. 9 shows a plot of the magnetic field strength component perpendicular to the two-layer PCB 91 produced per unit current flowing through the cosine winding, indicated by the full line 161, and a cosine function having a period of 10 mm, indicated by the dashed line 163. As shown, the magnetic field strength component 161 closely matches the cosine function 163 over a range of 6 mm.

Although the magnitudes of the magnetic field strength components per unit current produced by the sine winding and the cosine winding are slightly different, the amplitude of the magnetic field strength components can be adjusted by varying the current flowing through the sine winding and the cosine winding.

The sense winding starts at a first sense terminal 121a on the first surface and passes, via a third balancing winding 103c, to a first sense coil 123 formed by a conductive track which loops around the aperture 97 on the second surface 95. The sense winding then passes through a via hole to a second sense coil 125 formed by a conductive track which loops around the aperture 97 on to the first surface 93 in the same direction as the first sense coil. The sense winding then passes from the second sense coil 125 to a second sense terminal 121b via a fourth balancing winding 103d. The first sense coil 123 and the second sense 125 effectively form a pair of Helmholtz coils.

The first to fourth balancing windings 103 are included to ensure that, in the absence of the ferrite element 15, the sense winding is balanced with respect to both the sine winding and the cosine winding.

As mentioned earlier, the signal generation and processing circuitry for the second embodiment is identical with the signal generation and processing circuitry of the first embodiment. Therefore, in the same manner as the first embodiment, the signal induced in the sense winding has a phase which varies in accordance with the position of the ferrite element 15 along the measurement direction. In particular, it has been found that the relationship between the phase of the sense signal and the position of the ferrite element 15 is approximately linear over a range of 4 mm, and within that range the position of the ferrite element 15 can be determined to a resolution of approximately 10 m.

Third Embodiment

The first and second embodiments describe push button assemblies. The invention could, however, be applied to other types of man-machine interface. A third embodiment of the invention will now be described with reference to FIG. 10 in which the inductive sensor of the first embodiment is incorporated in a rotary switch assembly 171.

Figure 10:
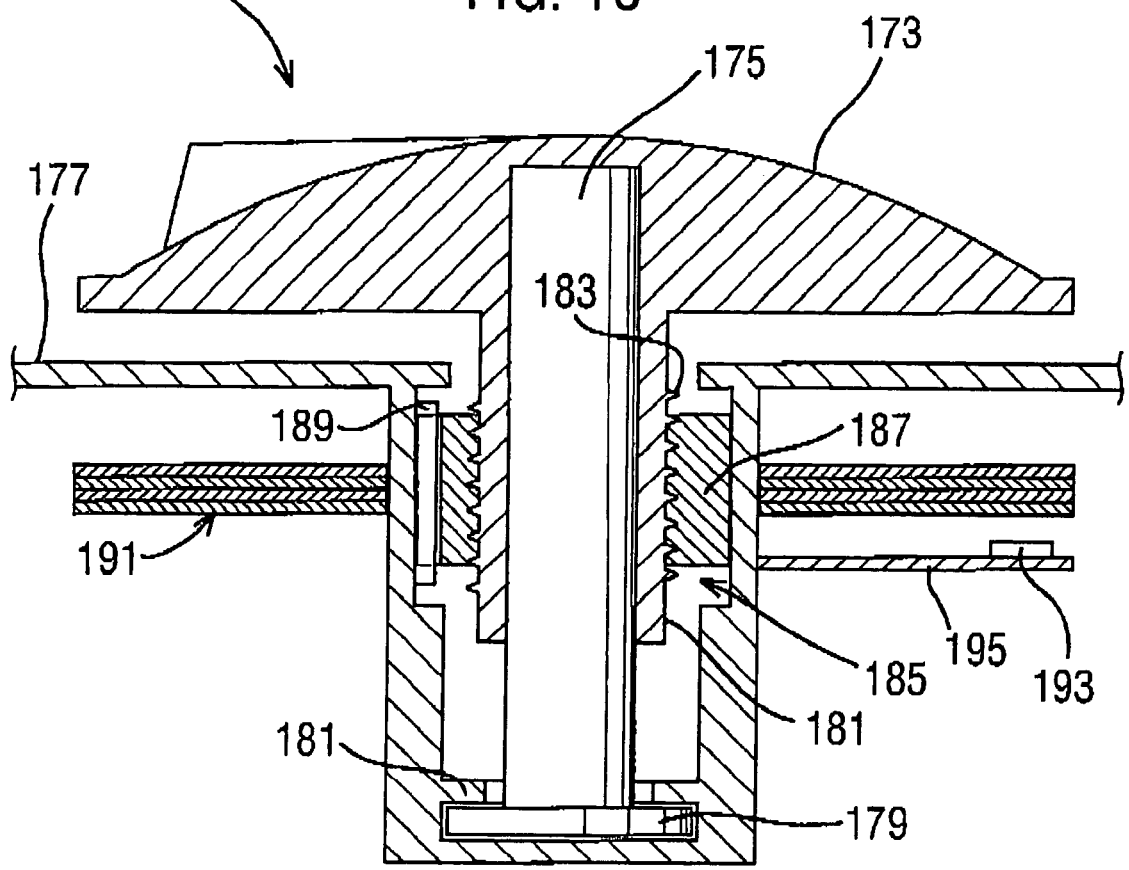
FIG. 10 schematically shows a side view of a rotary switch assembly which forms a third embodiment of the invention.

As shown in FIG. 10, the rotary switch assembly 171 has a switch head 173 which is mounted to an elongate cylindrical shaft 175, which in turn is rotatably mounted to in a recess in a fascia panel 177. In particular, a flange 179 is provided at the end of the shaft 175 inserted in the recess. The flange 179 engages a flange 181 provided on the inner surface of the recess to allow rotational movement of the shaft 175 about its longitudinal axis but prevent axial movement of the shaft 175 along its longitudinal axis.

The switch head 173 includes a sleeve portion 181 into which the shaft 175 is mounted, and which is partially inserted within the recess in the fascia panel 177. The sleeve portion includes a spiral thread 183 which runs around the outside cylindrical surface of the portion of the sleeve 181 inserted in the recess of the fascia panel 177.

The recess of the fascia panel 177 has a neck portion 185 which is adjacent to the threaded region of the sleeve 181. The neck portion 185 generally defines a cylindrical cavity between the sleeve 181 and the recess in the fascia panel 177 in which a hollow cylindrical ferrite bush 187 is inserted. A spline 189 is formed on the inner surface of the recess and engages a corresponding groove formed on the outer cylindrical surface of the ferrite bush 187 to prevent rotational movement, while allowing axial movement, of the ferrite bush 187 as the shaft 175 rotates. The inner cylindrical surface of the ferrite bush 187 has a female threading which engages the spiral thread 183 provided on the sleeve 181, and therefore when the switch head 171 rotates the corresponding rotation of the threaded region of the sleeve 181 applies a force to the ferrite bush 187 causing axial movement of the ferrite bush 187.

A five-layer PCB 191 is provided around the recessed portion of the fascia panel 177 adjacent the ferrite bush 187. A transmit aerial and a receive aerial are formed on the five-layer PCB 191, and are connected to signal generation and processing circuitry 193 provided on a separate PCB. In this embodiment, the transmit aerial, receive aerial and signal generation and processing circuitry are substantially identical to the corresponding components of the first embodiment. Therefore, by monitoring the signal induced in the receive aerial when the transmit aerial generates a magnetic field, the axial position of the ferrite bush 181 can be determined by the signal generation and processing circuitry 193. As each axial position corresponds to a respective different rotary position of the switch head 171, the rotary position of the switch head 171 can be determined from the axial position of the ferrite bush 187.

A particular advantage of this embodiment is that a range of rotation of the switch head 171 in excess of one full rotation can be unambiguously detected.

Fourth Embodiment

In the first to third embodiments, a man-machine interface includes an inductive sensor in which the phase of a signal induced in a sense winding as a result of excitation signals applied to two excitation windings is measured to determine the position of the ferrite element 15. However, other forms of inductive sensor could also be used to determine the position of the ferrite element 15.

Figure 11:
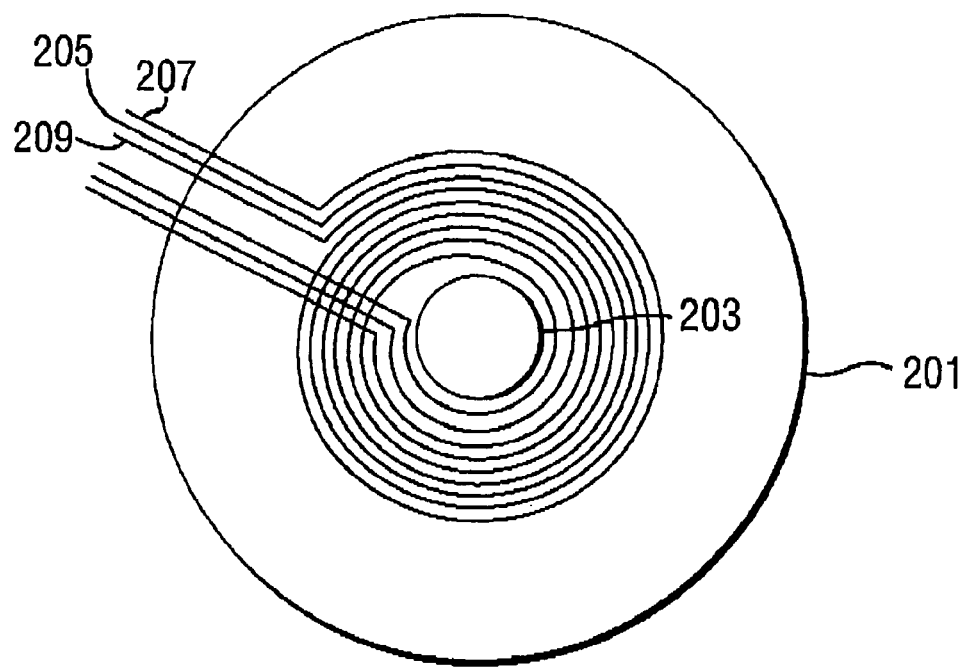
FIG. 11 schematically shows a plan view of a multi-layer printed circuit board of a fourth embodiment of the invention, and illustrates conductive tracks formed on different layers of the multi-layer printed circuit board.

A third embodiment will now be described with reference to FIGS. 11 and 12 in which a linear variable differential transducer (LVDT) type arrangement is used in a push button assembly to detect the position of the ferrite element 15. The only differences between the push button assembly of the third embodiment and the push button assembly of the first embodiment is that the multi-layer PCB and signal generation and processing circuitry of the first embodiment are replaced by an alternative multi-layer PCB and signal generation and processing circuitry. The remaining components of the push button assembly of the third embodiment are identical with the corresponding components of the push button assembly of the first embodiment, and will not therefore be described in detail again.

In the third embodiment, the multi-layer PCB 201 is a three-layer FR4 grade printed circuit board, with each layer of conductive tracks being deposited on a respective substrate layer having a thickness of 0.67 mm. An aperture 203 is formed completely through the centre of the multi-layer PCB 201. In this embodiment, the aperture 203 has a circular cross section with a diameter of 5 mm.

A conductive copper track is etched on each layer of the multi-layer PCB 201. As schematically shown in FIG. 11, which for illustrative purposes shows the conductive tracks formed on the three insulating layers of the multi-layer PCB as if formed on a single layer, each conductive track forms an annular coil around the hole. In this embodiment, the inner diameter of each annular coil is 6 mm and the outer diameter of each annular coil is 15 mm.

The conductive track on the central insulating layer forms an input coil 205 having an inductance of 5 H and the conductive tracks respectively formed on the outer insulating layers form a balanced pair of output coils 207,209 each having an inductance of 5 µH. As each conductive track is provided on a respective different insulating layer of the PCB, the conductor tracks are spaced at 0.67 mm intervals along the direction normal to the plane of the PCB. The ferrite rod 15 passes through the aperture 203 through the multi-layer PCB 201. The mutual inductance between the input coil 205 and each of the output coils 207,209 therefore varies in dependence upon the position of the ferrite rod 15, which in turn varies in response to the push button assembly being operated by a user.

Figure 12:
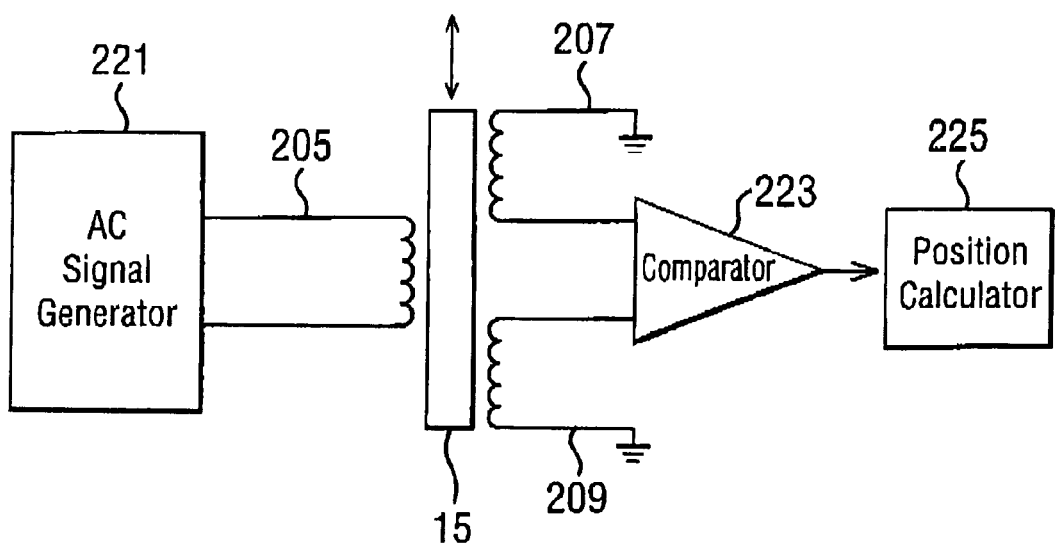
FIG. 12 schematically shows the main components of an inductive position sensor forming part of the fourth embodiment.

As shown in FIG. 12, in this embodiment the signal generation and processing circuitry includes an AC signal generator 221 which applies an AC signal having a frequency of 2 MHz to the input coil 205 in order to generate a magnetic field which induces an oscillating signal in each of the output coils 207,209. The amplitude of the oscillating signal induced in each of the output coils 207,209 is dependent upon the mutual inductance between the input coil 205 and that output coil. In particular, as the signal level in one of the output coils increases with movement of the ferrite element 15, the signal level in the other of the output coils decreases.

The signals induced in the output coils 207,209 are input to a comparator 223 which outputs a pulse width modulated signal having a duty factor which varies in dependence on the difference in amplitude between the two induced signals. The duty factor of the pulse-width modulated signal is therefore indicative of the position of the ferrite element 15. The pulse-width modulated signal is input to a position calculator 225 which converts the duty factor into a corresponding position value using a pre-stored look-up table.

In this embodiment, the duty factor of the pulse-width modulated signal varies approximately linearly with the position of the ferrite element 15 in the measurement direction for a range of movement for the ferrite element 15 along the measurement direction of approximately 8 mm.

Modifications and Further Embodiments

In the first to third embodiments, the push button assembly comprises a flexible membrane which arcs above an aperture through an ABS panel. Other mechanical arrangements are possible. For example, an alternative arrangement for the push button assembly is illustrated in FIGS. 13 and 14.

Figure 13:
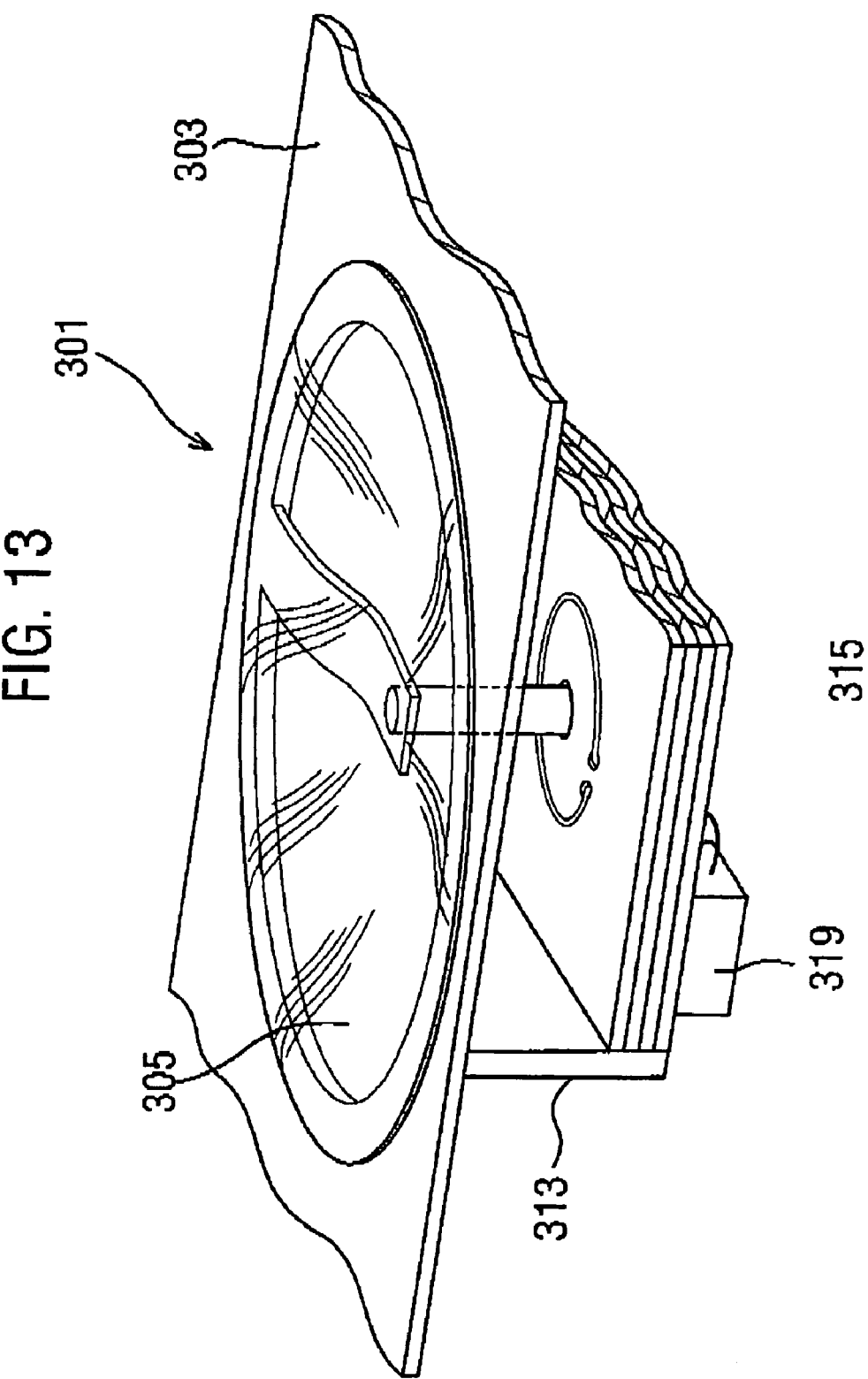
FIG. 13 schematically shows a perspective view of an alternative push button assembly.
Figure 14:
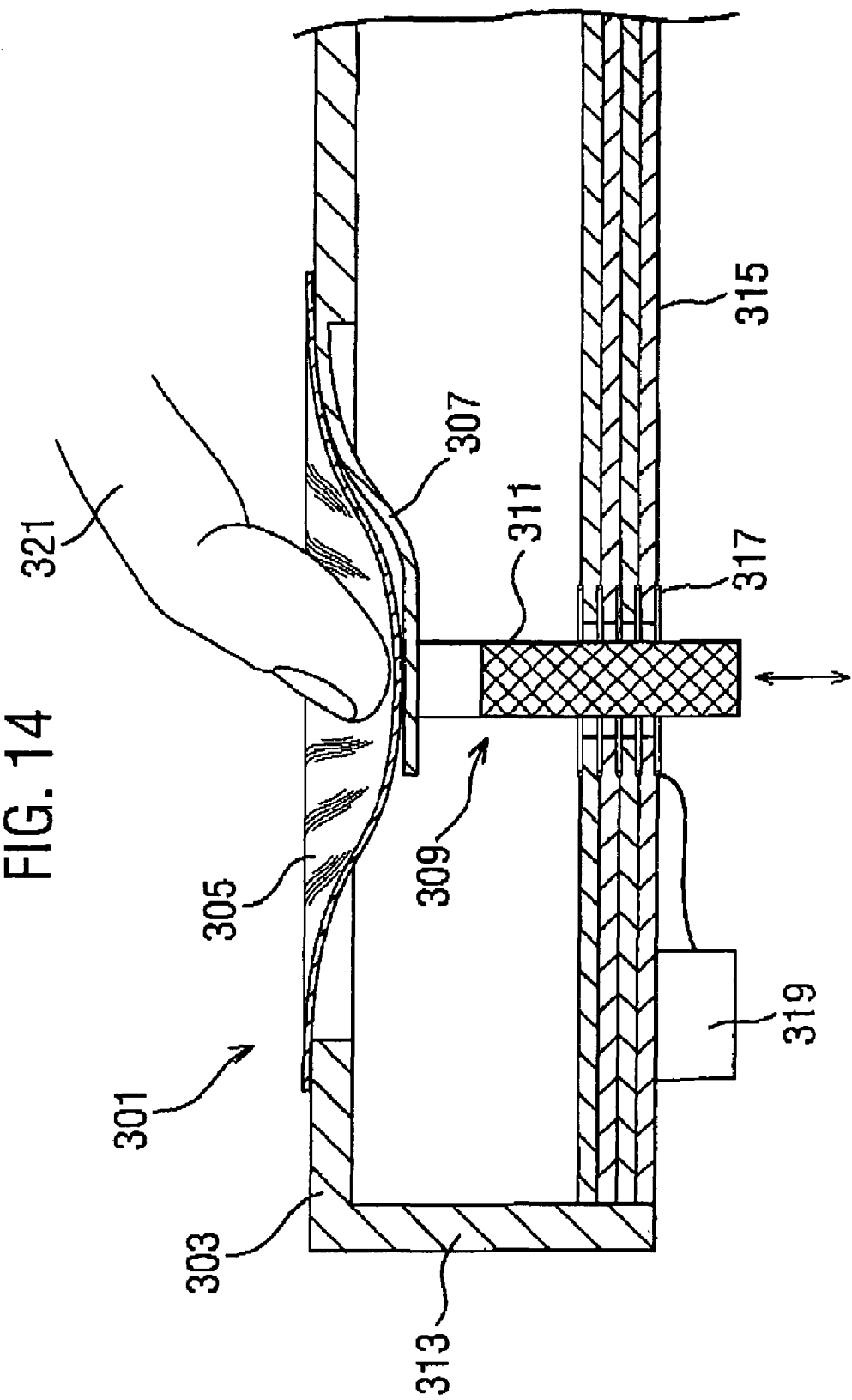
FIG. 14 schematically shows a side view of the alternative push button assembly illustrated in FIG. 13.

As shown in FIGS. 13 and 14, the alternative push button assembly 301 includes a planar ABS panel 303 having a circular aperture formed therethrough which is covered by a circular membrane 305, which in this embodiment is made of neoprene. The circular membrane 305 has the advantages of isolating the internal components of the push button assembly 301 from the outside, and also presenting a warm feel to a user operating the push button assembly.

A resiliently-deformable tongue portion 307 projects from the planar panel 303 to the centre of the aperture. A rod 309, including a ferrite element 311 is attached to the end of the tongue portion 307 and projects away from the planar panel 303 in a direction substantially perpendicular to the plane of the planar panel 303. In this way, when a user presses the circular membrane 305, the tongue portion 307 (and therefore the ferrite element 311) moves away from the planar panel 303 along a measurement direction substantially perpendicular to the plane of the planar panel 303.

A support member 313 projects away from the ABS panel 303 and supports a multi-layer PCB 315 having conductive tracks 317 formed thereon. The conductive tracks 317 are connected to signal generation and processing circuitry 319. In this embodiment, the conductive tracks 317 and signal generation and processing circuitry 319 are substantially identical to the conductive tracks and signal generation and processing circuitry of the first embodiment. The ferrite element 311 passes through the aperture of the multi-layer PCB 315 and therefore movement of the ferrite element 311 along the measurement direction is detected by the signal generation and processing circuitry 319 in the same manner as described in the first embodiment.

In the described embodiments, a push button assembly or a rotary switch assembly is incorporated in an ABS planar fascia panel. Generally, any form of rigid panel can be used. Further, a panel which can be deformed by the application of pressure could also be used, in which case the rod comprising the ferrite element could be directly attached to the panel and the membrane is not required.

In the described embodiments, a ferrite element is used as an intermediate coupling element between a transmit aerial and a receive aerial. It will be appreciated that any other magnetically permeable substance could be used, e.g. a grub screw, a nail, or a staple. If the fascia panel is made of a magnetically permeable material such as mild steel, even a deformable part of the fascia panel could be used as the intermediate coupling element.

Figure 15:
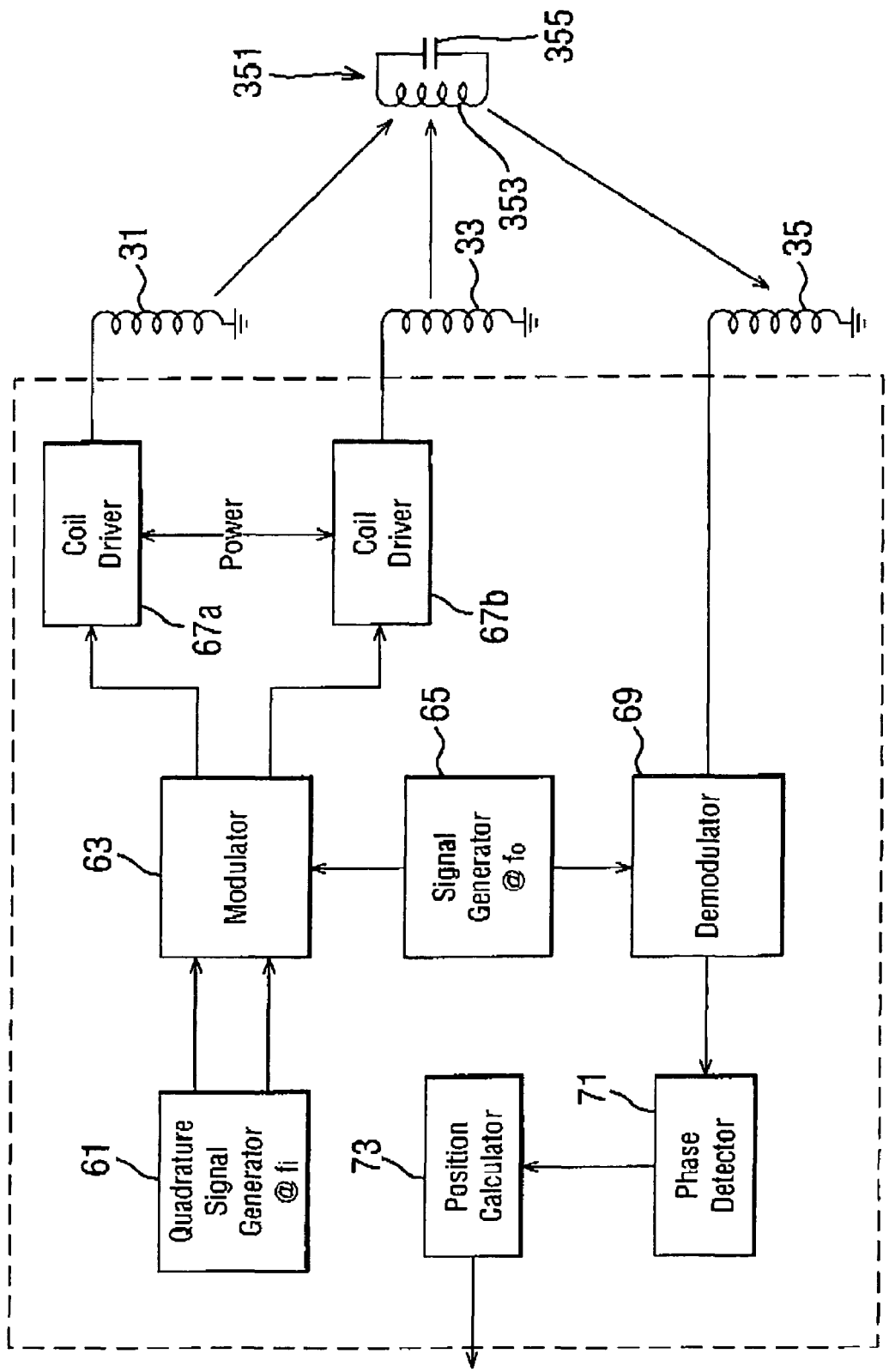
FIG. 15 schematically shows the main components of signal generation and processing circuitry forming part of another alternative push button assembly.

Other types of intermediate coupling element could be used, for example a conductive element or a conductive loop. In a preferred embodiment, as shown in FIG. 15, a resonant circuit 351 formed by an inductor 353 and a capacitor 355 replaces the ferrite element in the described embodiments, with the resonant frequency of the resonant circuit 355 being equal to the carrier frequency $f_0$ of the excitation signals applied to the sine winding and the cosine winding. The resonant circuit 351 allows large signal levels at the carrier frequency while filtering out signals at other frequencies. The demodulator 69 must, however, allow for a 90° phase shift in the sense signal introduced by the resonant circuit 351. Alternatively, the resonant circuit could be used in addition to the ferrite element.

Although in the described embodiments planar aerials are formed on printed circuit boards, planar aerials could alternatively be formed on other planar substrates. However, using printed circuit boards is preferred due to the maturity of printed circuit board manufacturing techniques which allow high quality aerials to be made at a relatively low cost.

In the first embodiment, the receive aerial of the axial position encoder is formed by current loops on the end faces of the multi-layer PCB. It will be appreciated that the receive aerial could also include one or more current loops on the intermediate faces of the multi-layer PCB.

The axial position encoder of the first embodiment has a sine winding and a cosine winding formed by single current loops on respective surfaces of a multi-layer PCB. In alternative embodiments, the sine winding and the cosine winding have plural conductive loops formed on respective surfaces of the multi-layer PCB. Further, the multi-layer PCB could have a different number of layers. In an embodiment, the multi-layer PCB has more than five layers and the number of conductive loops on each surface for the sine winding and the cosine winding varies along the axial direction in order to generate axial magnetic field components which vary in accordance with the sine function and the cosine function respectively.

In the first embodiment, a carrier signal at 2 MHz is modulated by a modulator signal at 3.9 kHz. Typically, the carrier signal may be in the range 500 kHz to 10 MHz and the modulation signal may be in the range 10 kHz to 100 kHz. In an alternative embodiment, the carrier signal has a frequency of 2 MHz and the modulator signal has a frequency of 2.5 kHz.

In the first and third embodiments, the transmit aerial and the receive aerial comprise conductive tracks formed in more than three parallel planes, in particular end surfaces and inter-layer surfaces of a multi-layer PCB. Instead of using a multi-layer planar substrate, plural separate planar substrates could be used. However, using a multi-layer planar substrate is preferred because of manufacturing simplicity.

In the first to third embodiments, the transmit aerial comprises two excitation windings and the receive aerial comprises a single sense winding. The signal induced in the sensor winding is dependant on the ratio of the electromagnetic coupling between (i) the sine winding and the sense winding, and (ii) the cosine winding and the sense winding. Such a ratiometric measurement is advantageous because it is less susceptible to variations in electromagnetic coupling due to environmental factors.

In an alternative embodiment, the transmit aerial comprises a single excitation winding and the receive aerial comprises a pair of sense windings, with a ratiometric measurement being performed by comparing the signals induced in the two sense windings.

In the third embodiment, the shaft 175 is prevented from moving axially, and a bush 187 which is coupled to the shaft 175 by a thread is prevented from rotating with the shaft 175 so that rotary movement of the shaft 175 causes axial movement of the bush 187.

In an alternative embodiment, a shaft is screwed directly into a recess with the shaft having a ferrite portion so that the transmit aerial and the receive aerial of the printed circuit board directly measure axial movement of the shaft as the switch head is rotated.

In the fourth embodiment, a specific example of an LVDT type sensor is described. This specific example can be modified in many ways without departing from the invention. In general, it has been found that:
1. The exact position of the ferrite element within the hole in the PCB is not critical.
2. The outer diameter of the coil should be of the same order as the length of the ferrite rod. In preferred embodiments, the outer diameter of the coils is between 0.5 and two times the length of the ferrite rod.
3. The area covered by the coils should be approximately two to ten times the area of the hole.
4. The AC signal applied to the input coil is preferably in the frequency range of 100 kHz to
5. A reasonably linear measurement range of up to one and a half times the diameter of the hole can be achieved.

In the fourth embodiment, the LVDT has an input coil and two output coils, with an excitation signal being applied to the input coil in order to induce signals in the output coil. Those skilled in the art will appreciate that other LVDT configurations could also be used. For example, matched coils could be formed on either side of a printed circuit board, with the matched coils being connected in series with each other and in parallel with a pair of matched resistors in order to form a bridge arrangement. In this way, by monitoring the potential difference between the connection point between the two coils and the connection point between the two resistors when an oscillating signal is applied across the two coils, the position of a ferrite rod passing through a hole in the printed circuit board around which the coils are formed can be determined.

In the third embodiment, the comparator outputs a pulse width modulated signal whose duty factor varies with the position of the ferrite rod. Other forms of digital data streams could, however, be output by the comparator.

In the first to fourth embodiments, the signal output by the inductive sensor varies approximately linearly with the position of the ferrite element over a measurement range, and therefore the signal output by the inductive sensor need only be multiplied by a calibration factor to obtain a position measurement. If the measurement range is extended so that the output of the inductive sensor no longer varies linearly with position, then a look-up table can be used to convert the output signal into a position measurement.

Figure 16A:
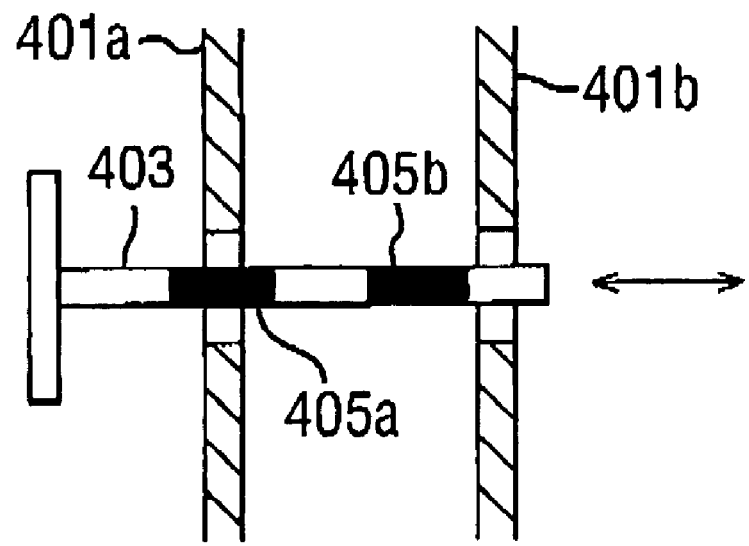
FIGS. 16A and 16B schematically show components of an alternative inductive position sensor using two printed circuit boards.
Figure 16B:
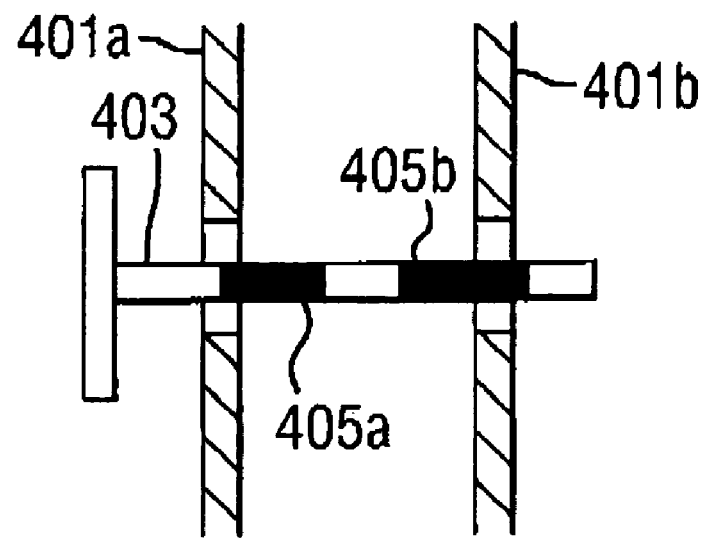

In the first to fourth embodiments, a push button assembly includes a position sensor which uses planar aerials to measure displacement along a path which intersects the plane of the aerials. The range of displacement is dependent upon the axial extent of the magnetic field generated by the sine winding and the cosine winding. The range of measurement can be increased by using more than one position encoder. FIGS. 16A and 16B show an embodiment in which two multi-layer PCBs 401a, 401b are spaced apart with their planes parallel, each multi-layer PCB 401 being identical to the multi-layer PCB described in the first embodiment. As shown, a rod 403 projects perpendicularly from a planar surface 405 through holes provided in the PCBs 401.

The rod 403 is generally insulating apart from two ferrite portions 405a, 405b which are spaced apart by a distance which is less than the distance between the two PCBs 401a, 401b. In particular, the two ferrite portions are spaced so that when the first ferrite portion 405a is within the actual measurement range associated with the first PCB 401a, as shown in FIG. 16A, the second ferrite portion 405b is outside the measurement range associated with the second PCB 401B. However, as the first ferrite portion 405a leaves the measurement range of the first PCB 401a in the direction of the second PCB 401b, the second ferrite portion 405b enters the measurement range of the second printed circuit board 401b, as shown in FIG. 16B. In this way, the effective linear measurement range can be almost doubled. Those skilled in the art will appreciate that by using either or both of additional magnetic portions and additional printed circuit boards, the linear measurement range could be still further increased.

Although in the described embodiments apertures are provided in the PCB substrates and the ferrite element passes through the aperture, this is not essential. For example, as shown in FIGS. 8 and 9, for the second embodiment magnetic field strength components perpendicular to the PCB substrate are produced which vary approximately according to a sine function and a cosine function to a distance of about 2 mm on either side of the PCB substrate. Therefore, the ferrite element need not physically pass through the PCB substrate for its position to be measured.

In the first to third embodiments, the signal generation and processing circuitry generates an in-phase signal I(t) and a quadrature signal Q(t) comprising a carrier signal at a carrier frequency modulated by respective modulation signals at a modulation frequency which is significantly less than the carrier frequency. The signal generation and processing circuitry also measures the phase of a component of a sense signal S(t) at the modulation frequency in order to determine a position value. As discussed in International Application WO 03/038379, the whole content of which is hereby incorporated herein by reference, this arrangement advantageously combines the increase in the magnitude of the coupling between a transmit aerial and a receive aerial resulting from the use of a comparatively high carrier frequency with the straightforward signal processing techniques used to measure the phase of a signal at the lower modulation frequency.

The push button assemblies described hereinbefore could be combined with a plurality of similar push button assemblies, preferably utilizing a common flexible membrane and a common multi-layer PCB, to form a keyboard.

The man-machine interfaces described above may be used as part of a user interface on many different machines. For example, the man-machine interface could form part of an exercise machine, such as a treadmill running machine or a rowing machine. As another example, the man-machine interface could form part of a white goods appliance such as a washing machine or a dishwasher. Further, the man-machine interface could form part of medical equipment.

If the push button assembly forms part of a user interface which may vibrate when the associated device is in use, it is preferable to ensure that the mechanical design of the push button assembly does not have a resonant vibration frequency which matches an expected frequency of vibration for the associated device. If multiple push buttons are provided on a common substrate, then the vibrational movement of all the push buttons can be determined by identifying common movement. Operation of one of the push buttons by a user is then detectable by identifying discrepancies between the movement of the operated push button and the other push buttons.

It will be appreciated that if multiple man-machine interfaces are formed on a common fascia panel, with each man-machine interface having a respective inductive sensor, then by user a multiplexing arrangement common signal generation and processing circuitry could be used for all the inductive sensors.

Further, the signal generation and processing circuitry could be used for other inductive sensors in the apparatus, e.g. vibration sensors and temperature sensors.

The present invention is not intended to be limited to the above described embodiments. Other modifications and embodiments would be apparent to those skilled in the art.

The invention claimed is:

1. A man-machine interface comprising:
    at least one planar substrate having formed thereon a magnetic field generator, the magnetic field generator comprising conductive tracks formed on at least two planes defined by the at least one planar substrate;
    a mounting carrying an intermediate coupling element, the mounting allowing movement of the intermediate coupling element along a measurement direction transverse to the planar substrate in response to a force applied by a user; and
    a detector operable to detect the position of the intermediate coupling element in a magnetic field generated by the magnetic field generator,
    wherein the magnetic field generator comprises a transmit aerial and the detector comprises a receive aerial, the transmit aerial and the receive aerial formed by conductive tracks formed on a first planar surface and a second planar surface on either side of a single-layer planar substrate and by through-plated via-holes through the single planar substrate;
    wherein movement of the intermediate coupling element along the measurement direction varies the electromagnetic coupling between the transmit aerial and the receive aerial;
    wherein the transmit aerial comprises a first excitation winding and a second excitation winding, the first excitation winding comprising at least one coil which is arranged about a first axis, which is in the plane of the planar substrate, such that in response to current flowing through the first excitation winding, a magnetic field is generated having a component along the measurement direction which varies in accordance with a first function; and
    wherein the second excitation winding comprises at least one coil which is arranged about a second axis, which is perpendicular to the plane of the planar substrate, such that in response to current flowing through the second excitation winding, a magnetic field is generated having a component along the measurement direction which varies in accordance with a second function which is different from the first function.

2. A man-machine interface according to claim 1, wherein the measurement direction is perpendicular to the or each planar substrate.

3. A man-machine interface according to claim 1, wherein the or each planar substrate has an aperture formed therethrough which is aligned with the measurement direction.

4. A man-machine interface according to claim 1, wherein the mounting defines an outer side and an inner side, wherein the at least one planar substrate and the detector are provided on the inner side, and the mounting provides a seal between the inner side and the outer side.

5. A man-machine interface according to claim 1, wherein the intermediate coupling element comprises a magnetically permeable body.

6. A man-machine interface according to claim 5, wherein the magnetically permeable body is a ferrite element.

7. A man-machine interface according to claim 1, wherein the intermediate coupling element comprises a resonant circuit.

8. A man-machine interface according to claim 1, wherein the at least one planar substrate comprises a printed circuit board.

9. A man-machine interface according to claim 1, wherein the at least one planar substrate comprises plural layers of a multi-layer printed circuit board.

10. A man-machine interface according to claim 1, wherein the transmit aerial comprises a first excitation winding and a second excitation winding,
    wherein in response to current flowing through the first excitation winding, a magnetic field is generated having a component in the measurement direction which varies with position along the measurement direction in accordance with a first function, and
    wherein in response to current flowing through the second excitation winding, a magnetic field is generated having a component in the measurement direction which varies with position along the measurement direction in accordance with a second function which is different to the first function.

11. A man-machine interface according to claim 10, wherein the first function is a sine function, the second function is a cosine function, and the man-machine interface further comprises:
    a signal generator operable to apply a pair of oscillating signal components which are in phase quadrature with each other to the first excitation winding and the second excitation winding respectively; and a signal processor operable to measure the phase of a signal component induced in the receive aerial to determine the position of the intermediate coupling element.

12. A man-machine interface according to claim 1, wherein the planar substrate is a printed circuit board.

13. A man-machine interface according to claim 1, wherein over a measurement range the first function is substantially a sine function and the second function is substantially a cosine function.

14. A man-machine interface according to claim 1, wherein the first excitation winding further comprises a first coil and a second coil about the first axis, the second coil being on the opposite side of the aperture to the first sine coil.

15. A man-machine interface according to claim 1, wherein the second excitation winding comprises a first coil and a second coil, the second coil being on the opposite side of the aperture to the first coil.

16. A keyboard comprising a plurality of interfaces as claimed in claim 1.

17. A keyboard according to claim 1, wherein the plurality of interfaces have a common planar substrate.

18. A position sensor, comprising:
at least one planar substrate having formed thereon a magnetic field generator, the magnetic field generator comprising conductive tracks formed on at least two planes defined by the at least one planar substrate;
an intermediate coupling element operable to move relative to the at least one planar substrate along a measurement direction transverse to the planar substrate; and
a detector operable to detect the position of the intermediate coupling element in a magnetic field generated by the magnetic field generator,
wherein the magnetic field generator comprises a transmit aerial and the detector comprises a receive aerial, and wherein movement of the intermediate coupling element along the measurement direction varies the electromagnetic coupling between the transmit aerial and the receive aerial,
wherein the transmit aerial comprises a first excitation winding and a second excitation winding,
wherein the first excitation winding comprises at least one coil which is arranged about a first axis, which is in the plane of the planar substrate, such that in response to current flowing through the first excitation winding, a magnetic field is generated having a component along the measurement direction which varies in accordance with a first function, and
wherein the second excitation winding comprises a at least one coil which is arranged about a second axis, which is perpendicular to the plane of the planar substrate, such that in response to current flowing through the second excitation winding, a magnetic field is generated having a component along the measurement direction which varies in accordance with a second function which is different from the first function.

19. A position sensor according to claim 18, wherein over a measurement range the first function is substantially a sine function and the second function is substantially a cosine function.

20. A position sensor according to claim 18, wherein the first excitation winding further comprises a first coil and a second coil about the first axis, the second coil being on the opposite side of the measurement direction to the first sine coil.

21. A position sensor according to claim 18, wherein the second excitation winding comprises a first coil and a second coil, the second coil being on the opposite side of the measurement direction to the first coil.

22. A position sensor comprising:
a planar substrate having a first planar surface and a second planar surface, the planar substrate having conductive windings formed thereon by conductive tracks on the first planar surface and the second planar surface interconnected by through-plated via-holes through the single planar substrate such that the conductive windings form a transmit aerial and a receive aerial; and
an intermediate coupling element operable to move relative to the at least one planar substrate along a measurement direction transverse to the planar substrate, wherein movement of the intermediate coupling element along the measurement direction varies the electromagnetic coupling between the transmit aerial and the receive aerial,
wherein the conductive windings include at least one coil which is arranged about a first axis which is in the plane of the planar substrate and at least one coil which is arranged about a second axis which is perpendicular to plane of the planar substrate.

23. A position sensor according to claim 22, wherein the planar substrate is a two layer printed circuit board.

24. A position sensor according to claim 22, wherein said at least one coil arranged about the first axis is operable to generate a magnetic field having a component along the measurement direction which varies over a measurement range substantially in accordance with a sine function in response to current flowing therethrough,
and wherein said at least one coil which is arranged about the second axis is operable to generate a magnetic field having a component along the measurement direction which varies over a measurement range substantially in accordance with a cosine function in response to current flowing therethrough.

25. A position sensor according to claim 22, comprising a first coil and a second coil about the first axis, the second coil being on the opposite side of the measurement direction to the first coil.

26. A position sensor according to claim 22, comprising a first coil and a second coil, the second coil being on the opposite side of the measurement direction to the first coil.

* * * * *

UNITED STATES PATENT AND TRADEMARK OFFICE
CERTIFICATE OF CORRECTION

| | | |
|---|---|---|
| PATENT NO. | : 7,196,604 B2 | Page 1 of 1 |
| APPLICATION NO. | : 10/724336 | |
| DATED | : March 27, 2007 | |
| INVENTOR(S) | : Sills | |

It is certified that error appears in the above-identified patent and that said Letters Patent is hereby corrected as shown below:

On the Title page of the issued patent, please delete Item [75] "David A. James, Harston (GB)" from the Inventors field.

Signed and Sealed this

Twenty-fourth Day of May, 2011

David J. Kappos
*Director of the United States Patent and Trademark Office*